March 6, 1956 W. HAMILTON 2,737,621
ELECTRIC MOTOR CONTROL FOR DOOR OPERATION
Original Filed Nov. 17, 1951 4 Sheets-Sheet 1
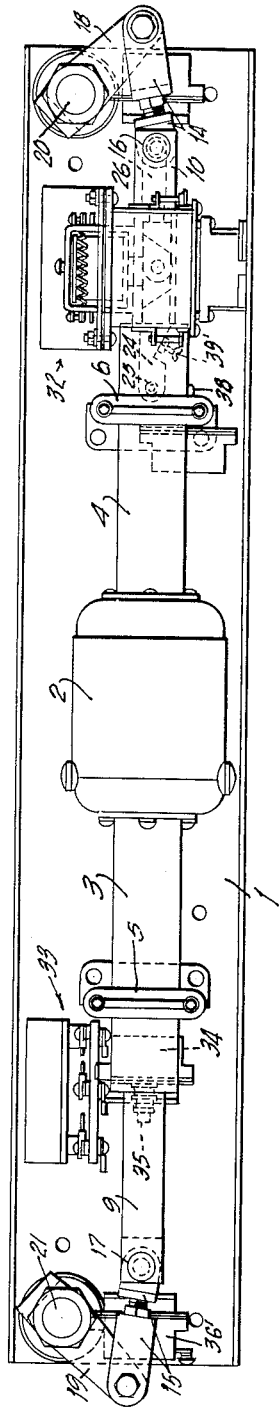
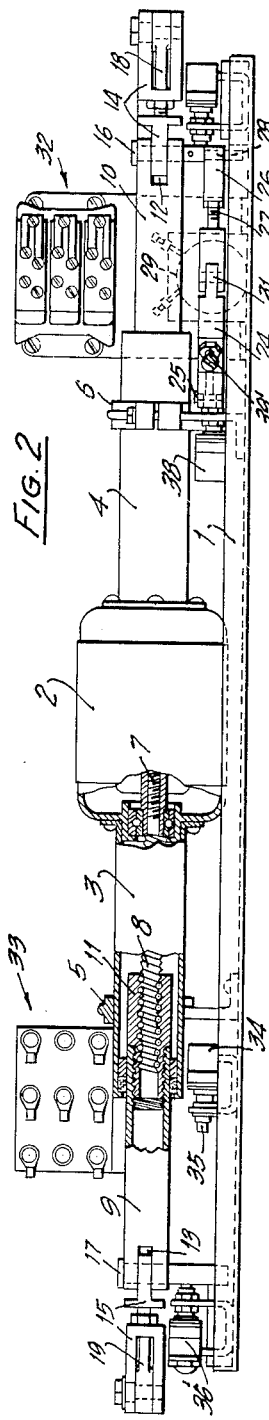
Inventor:
Wallace Hamilton,
by
His Attorneys.

Inventor:
Wallace Hamilton,
by
His Attorneys.

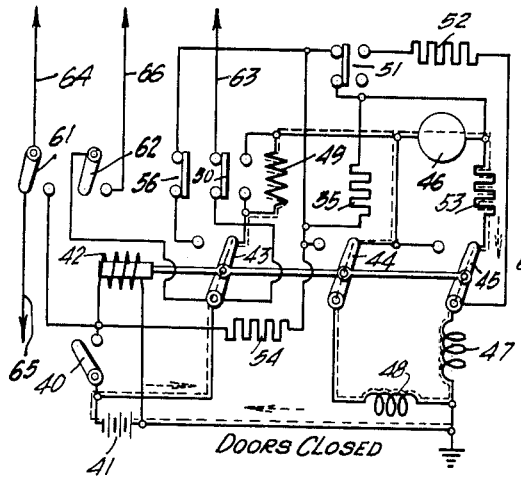
Fig.7 — Doors Closed
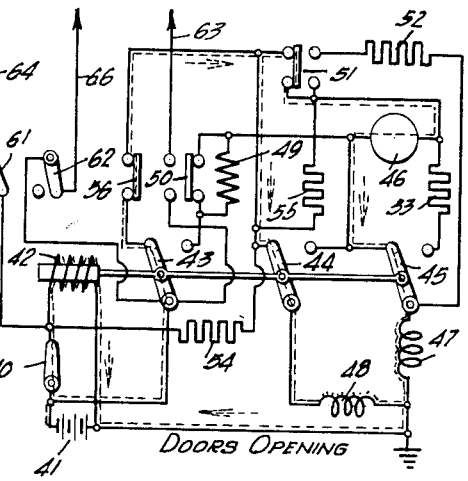
Fig.8 — Doors Opening
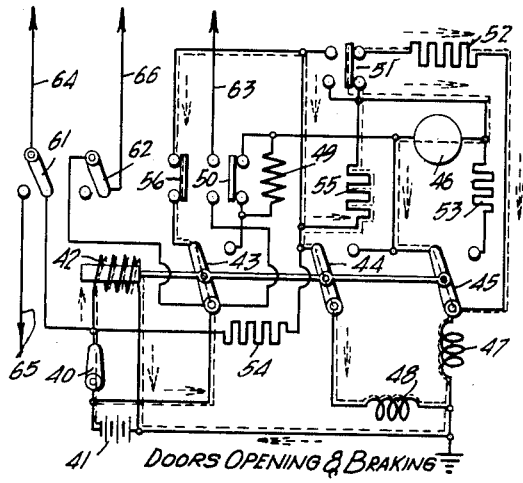
Fig.9 — Doors Opening & Braking
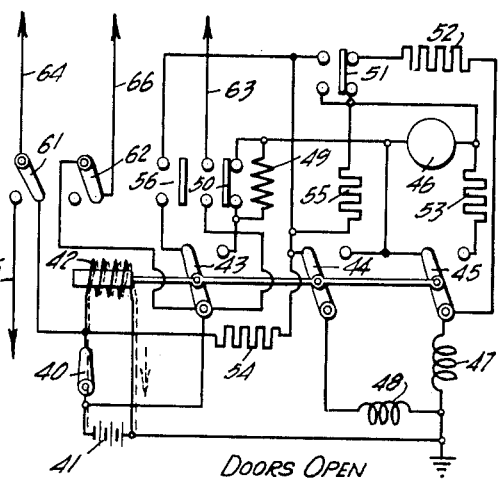
Fig.10 — Doors Open March 6, 1956   W. HAMILTON   2,737,621
ELECTRIC MOTOR CONTROL FOR DOOR OPERATION
Original Filed Nov. 17, 1951   4 Sheets-Sheet 4

Inventor:
Wallace Hamilton,
by
His Attorneys.

United States Patent Office 2,737,621
Patented Mar. 6, 1956

2,737,621

ELECTRIC MOTOR CONTROL FOR DOOR OPERATION

Wallace Hamilton, Birmingham, Ala., assignor to Consolidated Car-Heating Company, Inc., Albany, N. Y., a corporation of New York Original application November 17, 1951, Serial No. 256,864, now Patent No. 2,661,945, dated December 8, 1953. Divided and this application October 29, 1953, Serial No. 388,987

5 Claims. (Cl. 318—266)

This application is a division of my copending application Serial No. 256,864, filed November 17, 1951.

My invention relates to door operators and particularly to those which are actuated by electricity.

At the present time, compressed air is generally used for operating the doors of buses and the like although in some cases such doors are hydraulically operated. But compressed air systems have several inherent disadvantages. Despite regular precautions, the air lines and cylinders eventually become clogged with dirt and, in cold weather, condensation and freezing of moisture in the air lines and cylinders causes serious operating difficulties. Furthermore, piston packings have a limited life and, in some instances, must be replaced very frequently. Because of these difficulties, correct operating adjustments are difficult to maintain.

Hydraulic systems have most of these disadvantages plus several others. Loss of fluid due to leaks in the system can seriously affect the operation of the vehicle's brakes and, occasionally a leak sprays oil under high pressure into the interior of a vehicle loaded with passengers.

The principal object of my invention is to provide a safe, dependable, electrical unit for the control and operation of vehicle doors. A further object is to provide such a device which is adapted to replace the air and hydraulic cylinders now being used on buses to operate the doors thereof although it may be used to operate other types of doors.

In the drawings—

Fig. 1 is a plan view of the unit;

Fig. 2 is a front elevation with portions broken away;

Fig. 3 is an enlarged, fragmentary plan view, partially in section, of a detail;

Figs. 7, 8, 9, 10, 11, 12 and 13 are wiring diagrams showing the various switches and circuits which exist when the doors are in various positions.

Referring to the drawings—

Figure 4:
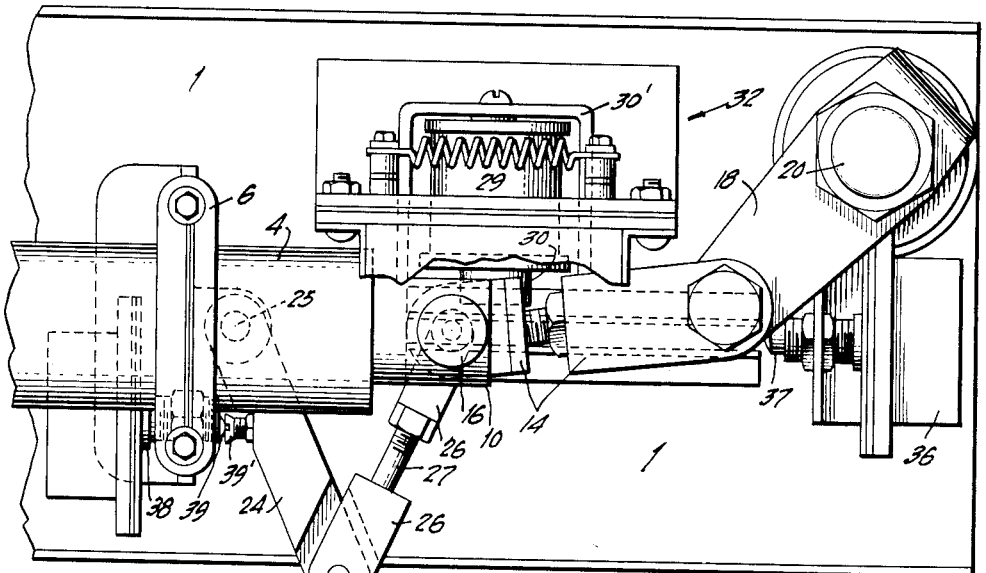
Fig. 4 is an enlarged, fragmentary plan view of another detail showing the relative position of the parts when the doors are in open position.
Figure 5:
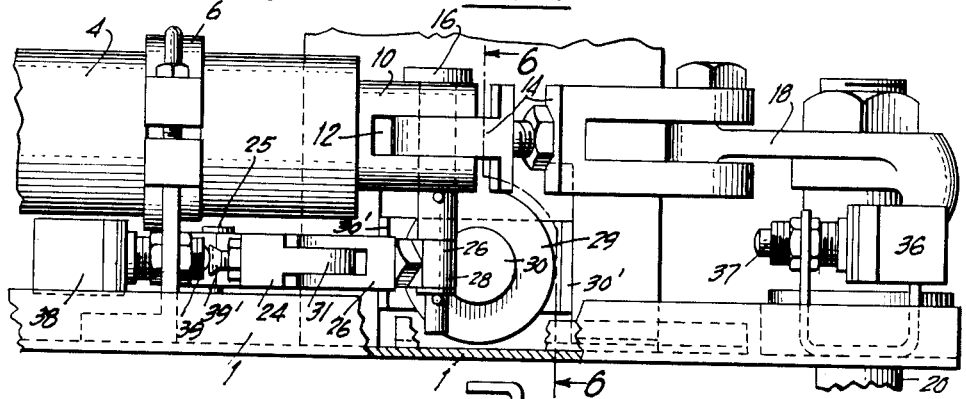
Fig. 5 is a front elevation view of the detail shown in Fig. 4.
Figure 6:
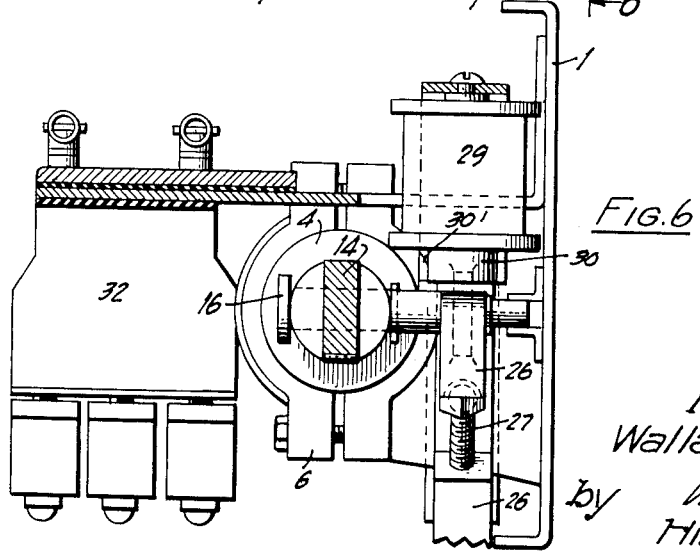
Fig. 6 is a section of Fig. 5 in the plane 6—6.

1 is the base to which various elements of the unit are attached. 2 is an electric motor having both a series and a shunt field winding, and having shaft housings 3 and 4 secured thereto on opposite sides by means of which the motor is supported in brackets 5 and 6. Secured to each end of the motor shaft 7 is a worm or screw 8, only one of which is shown, which coöperate with ball nuts 11 to form a reversible driving mechanism. That is to say, the motor may drive the nuts along the worms, or the motor may be driven by force applied to either of the nuts in a direction which will move it longitudinally of its associated worm. The nuts 11 are fixed to the shafts 9 and 10 which actuate the doors as follows: the free ends of the shafts 9 and 10 are bifurcated, as shown at 12 and 13 and have adjustable links 14 and 15 pivotally secured thereto by pins 16 and 17, respectively. The links 14 and 15 are pivotally secured to the arms 18 and 19, respectively, which, in turn, are clamped to the vertical shafts 20 and 21 which actuate the doors 22 and 23.

In order to lock the doors in closed position I provide a toggle which is actuated by the shaft 10 and which will be described in connection with Figs. 3, 4, 5 and 6. One leg 24 of the toggle is secured in fixed pivotal relation to the base and motor, as shown at 25 in Figs. 4 and 5; and the other leg 26, the length of which may be adjusted by means of the threaded rod 27, is pivotally connected at 28 to the shaft 10 by means of the pin 16 that connects the link 14 thereto.

Affixed to the base is an electromagnet 29 having the pole 30 thereof and a U-shaped frame 30', attached to the other pole with its free ends on opposite sides of the pole 30, forming a substantially closed magnetic circuit with the toggle members 24 and 26 when the knee 31 is in close proximity to the pole 30 and said toggle is almost but not quite straight. Thus, when the magnet 29 is energized, it will serve to hold the toggle in its almost straight condition and thus lock the doors in closed position.

Secured to the base is a relay, represented generally by the numeral 32 and which, when energized, actuates three separate switches, the function of which will be explained below in connection with Figs. 7–18, inclusive. 33 represents generally a terminal block to which electrical conductors serving properly to connect electrically the various control elements of the device are connected. The various circuits will be explained below and the manner in which the various automatic switches are connected in these circuits will also be explained.

Referring first, however, to Figs. 1 and 2, 34 represents an opening limit switch having an operating element 35 which is contacted by the pin 17, or other means moving with shaft 9, when the doors are open. 36 is a closing limit switch having an operating element 37 (see Figs. 4 and 5) which is actuated by the pin 16, or other means moving with shaft 10, when the doors are closed. 36' is another switch which is actuated by the pin 17 when the doors are closed. 38 is an opening braking switch having an operating element 39 which is actuated by the machine screw 39' in leg 24 of the toggle when the doors are almost open. The screw 39' may be adjusted when the operator is installed so that switch 38 is actuated at precisely the proper time.

Referring now to Figs. 7–13, inclusive, in connection with Figs. 14–18, inclusive, Fig. 7 shows the position of the various switches when the doors are in closed position. 40 is the manually controlled operating switch; 41 is the battery; 42 is the coil of relay 32, which, when energized, moves the switches 43, 44 and 45 to the left; 46 represents the armature of the motor 2 having the series field 47 and the shunt field 48; 49 is the coil of the electromagnet 29 which locks the doors in closed position, and which is of comparatively high resistance; 50 is a diagrammatic showing of the closing limit switch 36; 51 is a similar showing of the opening braking switch 38; 52 is the braking resistor which has a comparatively low resistance; 53 is the closing speed resistor; 54 is the relay holding resistor; 55 is a current limiting resistor; and 56 is a diagrammatic showing of the opening limit switch.

All of the circuit forming means are shown in solid outline, but the particular circuits which are established from time to time are shown in dotted outline, and the direction of current flow therein is indicated by the arrows.

When the doors are in closed position, the switches and circuits are as shown in Fig. 7. The switch 40 is open, the relay coil 42 is not energized, and the switches 43, 44 and 45 controlled thereby are in the positions shown in this figure. In this position, current from the battery 41 flows through the switch 43, the coil 49 of the locking electromagnet, the armature 46 of the motor, the closing speed resistor 53, the switch 45, the series field 47 of the motor, and back to the battery; and also from coil 49 through switch 44, and the shunt field 48 of the motor back to the battery. Since the resistance of the coil of the electromagnet which locks the doors in closed position is comparatively high, as pointed out above, and considerably greater than the balance of the circuit, the current flowing through the circuit is sufficient to energize the coil of the electromagnet but is not sufficient to operate the motor.

Referring now to Fig. 8, when the control switch 40 is closed, the relay coil 42 is energized and the switches 43, 44 and 45 are thrown into the position here shown, and the following circuits are then established: From battery 41 through the switch 40, the relay coil 42, and back to the battery. At the same time, another circuit is established from the battery 41 through switch 43, opening limit switch 56, opening braking switch 51, the armature 46 of the motor, switch 45, the series field winding 47 and back to the battery. A third circuit is also established through the switch 44, the shunt field winding 48 of the motor, and thence to the battery. It will be noted that the coil 49 of the electromagnet which locks the doors in closed position is now deenergized by the movement of the switch 43 to the left, and is shunted by the release of the closed limit switch.

As the doors approach their fully open position, circuits are established as shown in Fig. 9. The opening movement of the doors automatically moves the opening braking switch 51 to the position shown in Fig. 9. When the doors are almost open, the relay coil 42 remains energized, and the following circuits are established: From the battery through the switch 43, opening limit switch 56, switch 44, the shunt field winding 48 of the motor, and back to the battery. Two other circuits are simultaneously established, one of which includes the current limiting resistor 55, the opening braking switch 51, the opening braking resistor 52, the series field 47 of the motor, and back to the battery; and the other circuit through the armature 46 of the motor; the switch 45 and the series field winding 47 back to the battery. In this position, it will be noted that the circuit through the shunt field 48 is the same as in Fig. 8. The current flow through the rest of the motor circuit however, passes through the resistor 55, the armature 46 of the motor, the series field 47 to the battery and also through the opening braking switch 51, the resistor 52, and the field 47 to the battery, thus partially shunting the armature 46. The armature current is thus greatly reduced with respect to that of the fields and causes the motor to rotate at a much slower speed. The kinetic energy of the moving doors then drives the motor which acts like a generator. The current generated by this driving action is dissipated in the form of heat in the resistor 52 in the circuit which shunts the armature, and the motor exercises a braking effect which prevents the doors from slamming as they reach the fully open position. Since the resistance of the resistor 52 is comparatively low, the current from the battery is limited by the action of the resistor 55. The resistances of the resistors 52 and 55 are interdependent and must be such that the motor will still operate slowly towards the opening position in the event some obstacle slows up the opening doors.

When the doors reach the fully open position, the opening limit switch 56 is automatically opened by the movement of the doors and breaks the circuit through the motor, leaving only the relay coil 42 in energized condition. The circuits then are as shown in Fig. 10.

Figure 11:
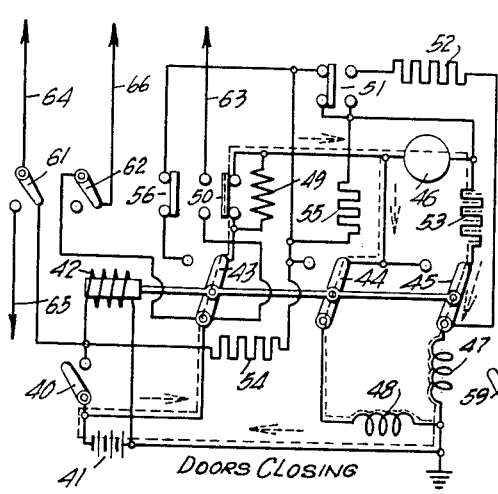

In order to close the doors, the control switch 40 is opened as shown in Fig. 11. This deenergizes the relay coil 42, the switches 43, 44 and 45 reassume their original positions, and the following circuits are established: From the battery through switch 43, closing limit switch 50, armature 46, but in a direction opposite the direction in which the current flows therethrough during the door opening movement as shown in Fig. 8, through the resistor 53, switch 45, series field 47 and back to the battery. Another circuit is established through the switch 44 and through the shunt winding 48. Because the resistor 53 is now in series with the armature and the series field of the motor, the motor operates at a slower rate than during the door opening movement, thereby causing the doors to close at a somewhat slower speed than that at which they open. When the doors reach closed position, the closing limit switch 50 is automatically moved from the position shown in Fig. 11 to the position shown in Fig. 7, thereby energizing the high resistance coil 49 of the electromagnet which locks the doors in closed position and reestablishes the circuit shown in Fig. 7.

Figure 12:
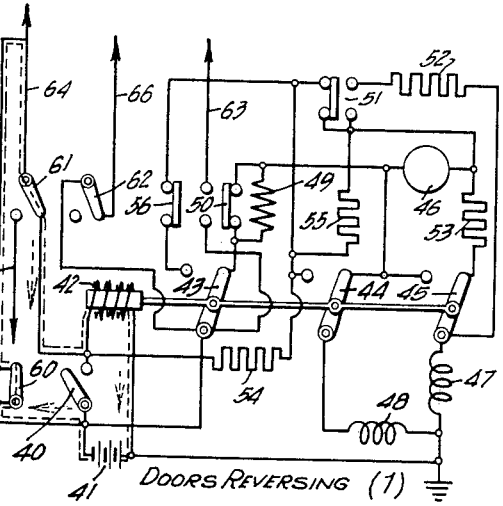

The adjacent edges 57 and 58 of doors of the type shown in Figs. 14–18, inclusive, are usually fitted with so called "sensitive edges" comprising switches encased in rubber tubes which will close when either of the tubes is deformed by pressure applied to the outside of the tube. The doors shown in the last mentioned figures are to be understood as being equipped with such edges, and the switches 59 and 60 in Fig. 12 are to be understood as diagrammatically representing the switches in the door edges. Either one or both of these switches may be closed by pressure exerted on the edge of the door by an obstacle encountered in the closing thereof. The switch 61, as shown in Figs. 7–12, inclusive, is a diagrammatic showing of the switch 36' in Figs. 1 and 2, and the switch 62 may be associated therewith or with the closed limit switch 50 so that they are automatically actuated to the positions shown in Fig. 7 when the doors are closed. If there is no pressure against the edges of the door, both switches 59 and 60 are normally open.

Figure 13:
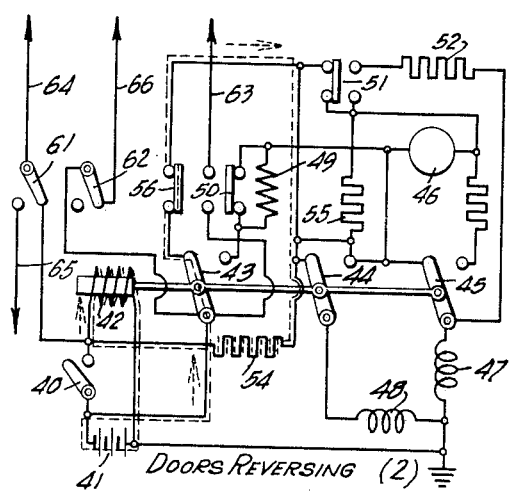
Figure 14:
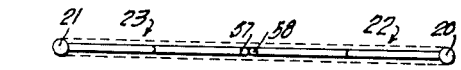
Figs. 14, 15, 16, 17 and 18 are diagrammatic plan views showing the doors in various positions.
Figure 15:
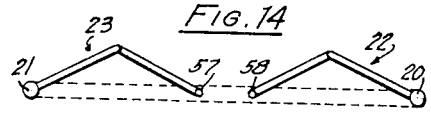
Figure 16:
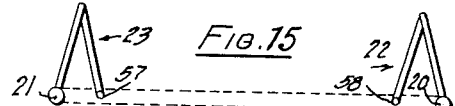
Figure 17:
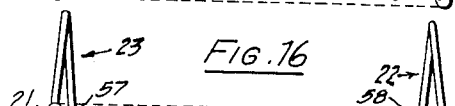
Figure 18:
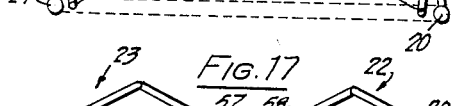

Assuming that, as the doors are closing and the switches and circuits are as shown in Fig. 11, pressure is applied to the edge of the door with which the switch 60 is associated, this switch will close, as shown in Fig. 12, and, initially, establish a circuit from the battery through the relay coil 42 which will energize the relay and cause the switches 43, 44 and 45 to move to the left into the position shown in Fig. 13. When the pressure which closed switch 60 is relieved this switch, of course, opens but, the energization of the relay coil which was initially, and perhaps only momentarily, effected by the closing of switch 60, causes the switches 43, 44 and 45 to move to the position shown in Fig. 13, whereupon a new relay coil energizing circuit (shown in dotted outline in Fig. 13) is established from the battery through switch 43, opening limit switch 56, resistor 54, said coil 42 and back to the battery. At the same time, circuits (shown in solid outline in Fig. 13) are established from the battery through switch 51, the armature of the motor, switch 45, the series field winding 47 and back to the battery; and through switch 44, and the shunt field winding 48 back to the battery. In other words, these last mentioned circuits are the door opening circuits through the motor shown in Fig. 8. When the doors reach the fully open position, the opening limit switch 56 is automatically opened, which deenergizes the relay, causes the switches 43, 44 and 45 to move into the position shown in Fig. 11, and the doors start closing. When closed, the closing limit switch 50 automatically opens, and the circuits shown in Fig. 7 are reestablished.

In addition to acting as a closing limit switch, the switch 50 may also function to operate a signal light to let the operator know when the doors are fully closed; the conductor 63 running to the signal light (not shown)

and a conductor (not shown), returning from the signal light to the battery.

The switch 62, which is automatically actuated simultaneously with the switch 61 and the closed limit switch, may be used through the conductor 66 to control an interlock device (not shown), such as a relay or magnetic air valve, controlling the power supply of the vehicle and its brakes so that no power will be available when the vehicle's brakes are set unless the doors are fully closed.

The conductor 64 extends from one terminal of the switch 61 to the sensitive edges, as shown in Fig. 12, and the conductor 65 transfers any impulse from the sensitive edges merely to a warning bell (not shown) when the doors reach the closed position. Thus, when the doors are closed, they cannot be opened by pressure on the sensitive edges but any pressure on the sensitive edges however, will sound the warning bell which will indicate to the operator any attempt to pry open the doors which are, of course, locked by the cooperation of the electromagnet 29 with the toggle.

It is obvious from the above description that the doors are held locked in the closed position by magnetic means only. In the event of a power failure, there would be no current passing through the lock coil, and the doors can then be opened manually, since the ball nut and screw are reversible in action. Also, in the case of an emergency, the doors could be opened manually by a passenger after operating an emergency switch (not shown), which would merely disconnect the source of battery voltage to the operator.

From the foregoing, it will be clear that I have provided an electrically operated unitary device which may be employed for opening and closing doors of elevators, buses, trains and the like and which, except for the manually operated control switch 40, is a compact unit from which conductors may be run to the various auxiliary devices which it is desired to be operated thereby.

While I have described my invention in its preferred embodiment, it is to be understood that the words which I have used are words of description rather than of limitation and that changes, within the purview of the appended claims, may be made without departing from the true scope and spirit of my invention in its broader aspects.

What I claim is:

1. In a device for opening and closing a door, the combination with an electric motor having an armature, a series field, a shunt field, and a worm connected to the shaft thereof; a nut on said worm and driven thereby adapted to be connected to said door to effect an opening and closing thereof; a relay; a plurality of switches having movable elements normally holding a first set of circuits closed but simultaneously movable by said relay, when energized, to open said circuits and close a second set of circuits; one of said first set of circuits including, in series, a first of said switches, an electromagnet having a comparatively high resistance limiting the current flow in said circuit, a second of said switches, and said shunt field; and another of said first set of circuits including, in series, said first switch, said electromagnet, said armature, a third one of said switches, and said series field; the current flowing in said first set of circuits tending to drive said motor in a door-closing direction; a manually operable switch for energizing said relay, when closed, to open said first set of circuits and close said second set of circuits; one of said second set of circuits by-passing said electromagnet and including, in series, said first switch, said second switch and said shunt field; and another of said circuits, also by-passing and de-energizing said electromagnet, including, in series, said first switch, said armature, said third switch, and said series field; the current flowing in said second set of circuits driving said motor in a door-opening direction; and a switch automatically actuated by said device when said door is substantially fully opened for breaking said second set of circuits.

2. The structure set forth in claim 1, together with a switch automatically actuated when said door is in proximity to its fully opened position for closing a circuit partially shunting the current flow through said armature; whereby to reduce the speed of said motor and cause it to exercise a braking influence on the opening movement of said door.

3. The structure set forth in claim 1 together with means cooperating with said electromagnet, when energized, for locking said door in closed position and unlocking it when de-energized.

4. The structure set forth in claim 1, together with a switch automatically actuated when said door is in proximity to its fully opened position for closing a circuit partially shunting the current flow through said armature; whereby to reduce the speed of said motor and cause it to exercise a braking influence on the opening movement of said door; and means cooperating with said electromagnet, when energized, for locking said door in closed position and unlocking it when de-energized.

5. The structure set forth in claim 1 in which the free edge of said door is provided with pressure sensitive means and a normally open switch actuated to closed position by pressure on said means, when said door is moving to closed position, for energizing said relay to open said first set of circuits and close said second set of circuits; whereby to reverse the movement of said door.

References Cited in the file of this patent

UNITED STATES PATENTS

| | | |
|---|---|---|
| 2,558,032 | Andrews | June 26, 1951 |
| 2,676,294 | Wilcox | Apr. 30, 1954 |